(12) United States Patent
Kaminski et al.

(10) Patent No.: US 7,846,522 B2
(45) Date of Patent: *Dec. 7, 2010

(54) DISCOLORATION-RESISTANT ARTICLES FOR APPLYING COLOR ON SURFACES AND METHODS OF REDUCING DISCOLORATION IN ARTICLES FOR APPLYING COLOR ON SURFACES

(75) Inventors: Anneke Margaret Kaminski, Cincinnati, OH (US); John Vincent Fontana, Cincinnati, OH (US); Keith L. Truog, Crown Point, IN (US); Roger A. Fahlsing, Hobart, IN (US); Valery Golub, Highland, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/204,304

(22) Filed: Aug. 15, 2005

(65) Prior Publication Data

US 2006/0046028 A1 Mar. 2, 2006

Related U.S. Application Data

(63) Continuation of application No. PCT/US2004/004504, filed on Feb. 13, 2004, which is a continuation-in-part of application No. 10/457,826, filed on Jun. 9, 2003, now Pat. No. 7,132,142, and a continuation-in-part of application No. 10/367,611, filed on Feb. 14, 2003, now abandoned.

(51) Int. Cl.
*B32B 33/00* (2006.01)
*D06N 7/04* (2006.01)

(52) U.S. Cl. .................. 428/40.1; 428/41.5; 428/41.6; 428/42.1; 428/141; 428/904.4; 428/906

(58) Field of Classification Search ................ 428/40.1, 428/40.2, 41.6, 42.1, 327, 337, 41.5, 41.8, 428/141, 202, 204, 343, 352, 354, 904.4, 428/906

See application file for complete search history.

(56) References Cited

U.S. PATENT DOCUMENTS 1,365,715 A 1/1921 Morrison (Continued)

FOREIGN PATENT DOCUMENTS

DE 22 54 430 3/1974

(Continued)

OTHER PUBLICATIONS

PCT Search Report, mailed Aug. 23, 2004, 7 pages.

(Continued)

*Primary Examiner*—Patricia L Nordmeyer
(74) *Attorney, Agent, or Firm*—Jeffrey V Bamber (57) ABSTRACT

Layered articles for applying color on a surface including a sheet of visually-perceivable color effects, a bonding agent capable of bonding the sheet to the surface, and a releasable liner removably attached to the sheet. The article further includes a substance, agent or barrier that prevents or, at the least, reduces the transfer of an extraneous agent from the surface to a location in the layered article that would affect the visually-perceivable color effect conveyed by the sheet.

5 Claims, 2 Drawing Sheets

U.S. PATENT DOCUMENTS

| | | |
|---|---|---|
| 2,746,893 A | 5/1956 | Matthes |
| 3,152,030 A | 10/1964 | Sampson |
| 3,301,741 A | 1/1967 | Henrickson et al. |
| 3,314,838 A | 4/1967 | Erwin |
| 3,331,729 A | 7/1967 | Danielson et al. |
| 3,616,192 A | 10/1971 | Sinclair |
| 3,640,791 A | 2/1972 | Rosenheim |
| 3,654,044 A | 4/1972 | Hirota |
| 3,666,516 A | 5/1972 | Dunning |
| 3,671,236 A | 6/1972 | Van Beusekom |
| 3,741,786 A | 6/1973 | Torrey |
| 3,743,086 A | 7/1973 | Aldrich |
| 3,804,700 A | 4/1974 | Hoey |
| 3,896,249 A | 7/1975 | Keeling et al. |
| 3,900,644 A | 8/1975 | Sackoff et al. |
| 3,900,645 A | 8/1975 | Morgan |
| 3,916,046 A | 10/1975 | Youngberg |
| 3,933,702 A | 1/1976 | Caimi et al. |
| 4,037,008 A | 7/1977 | Tugwell |
| 4,054,697 A | 10/1977 | Reed et al. |
| 4,068,033 A | 1/1978 | Meade |
| 4,094,690 A | 6/1978 | Morton |
| 4,151,319 A | 4/1979 | Sackoff et al. |
| 4,175,156 A | 11/1979 | Ikins |
| 4,205,107 A | 5/1980 | Jaschke et al. |
| 4,210,485 A | 7/1980 | Lake |
| 4,232,077 A | 11/1980 | Meisel |
| 4,235,657 A | 11/1980 | Greenman et al. |
| 4,241,129 A | 12/1980 | Marton et al. |
| 4,248,762 A | 2/1981 | Hornibrook et al. |
| 4,248,917 A | 2/1981 | Hornibrook et al. |
| 4,256,794 A | 3/1981 | Meisel |
| 4,258,096 A | 3/1981 | LaMarche |
| 4,262,051 A | 4/1981 | Welz et al. |
| 4,298,647 A | 11/1981 | Cancio et al. |
| 4,369,157 A | 1/1983 | Conner |
| 4,376,151 A | 3/1983 | Parrotta |
| 4,376,159 A | 3/1983 | Spechler |
| 4,377,050 A | 3/1983 | Renholts |
| 4,451,522 A | 5/1984 | de Vroom |
| 4,499,130 A | 2/1985 | Questel et al. |
| 4,514,457 A | 4/1985 | Sasaki |
| 4,517,044 A | 5/1985 | Arnold |
| 4,524,097 A | 6/1985 | Graham |
| 4,550,683 A | 11/1985 | Jones |
| 4,555,441 A | 11/1985 | Rothenberg |
| 4,555,471 A | 11/1985 | Barzynski et al. |
| 4,556,595 A | 12/1985 | Ochi |
| 4,560,587 A | 12/1985 | Sasaki |
| 4,564,406 A | 1/1986 | Binks |
| 4,598,020 A | 7/1986 | Panush |
| 4,650,704 A | 3/1987 | Rothenberg |
| 4,661,182 A | 4/1987 | Lerner |
| 4,737,225 A | 4/1988 | Waugh et al. |
| 4,759,441 A | 7/1988 | Leurck |
| 4,783,354 A | 11/1988 | Fagan |
| 4,786,537 A | 11/1988 | Sasaki |
| 4,818,589 A | 4/1989 | Johnson et al. |
| 4,854,610 A | 8/1989 | Kwiatek |
| 4,871,618 A | 10/1989 | Kinneberg et al. |
| 4,888,244 A * | 12/1989 | Masubuchi et al. ......... 428/416 |
| 4,894,274 A | 1/1990 | Graham et al. |
| 4,902,557 A | 2/1990 | Rohrbacher |
| 4,919,994 A | 4/1990 | Incremona et al. |
| 4,999,076 A | 3/1991 | Incremona et al. |
| 5,000,810 A | 3/1991 | Silverstein |
| 5,034,269 A | 7/1991 | Wheeler |
| 5,045,569 A | 9/1991 | Delgado |
| 5,073,422 A | 12/1991 | Konno et al. |
| 5,073,457 A | 12/1991 | Blackwell |
| 5,075,149 A | 12/1991 | Owens et al. |
| 5,084,317 A | 1/1992 | Epple |
| 5,114,514 A | 5/1992 | Landis |
| 5,134,012 A | 7/1992 | Arakawa et al. |
| 5,135,798 A | 8/1992 | Muschter et al. |
| 5,141,584 A | 8/1992 | Schuh et al. |
| 5,141,790 A | 8/1992 | Calhoun et al. |
| 5,169,474 A | 12/1992 | Binder |
| 5,183,696 A | 2/1993 | Sanderson |
| 5,192,612 A | 3/1993 | Otter et al. |
| 5,196,246 A | 3/1993 | Kauss et al. |
| 5,198,301 A | 3/1993 | Hager et al. |
| 5,203,941 A | 4/1993 | Spain et al. |
| 5,215,826 A | 6/1993 | Shimanski et al. |
| 5,229,207 A | 7/1993 | Paquette et al. |
| 5,250,336 A | 10/1993 | Greuse et al. |
| 5,266,372 A | 11/1993 | Arakawa et al. |
| 5,308,694 A * | 5/1994 | Andersson ................. 428/331 |
| 5,316,843 A | 5/1994 | Kiryu et al. |
| 5,322,708 A | 6/1994 | Eissele |
| 5,342,666 A | 8/1994 | Ellison et al. |
| 5,346,766 A | 9/1994 | Otter et al. |
| 5,413,829 A | 5/1995 | Brown et al. |
| 5,430,904 A | 7/1995 | Ono et al. |
| 5,441,784 A | 8/1995 | Smith |
| 5,451,440 A | 9/1995 | Tynan, Jr. |
| 5,460,855 A | 10/1995 | Andersson |
| 5,468,532 A | 11/1995 | Ho et al. |
| 5,476,901 A | 12/1995 | Smith et al. |
| 5,482,182 A | 1/1996 | Thompson et al. |
| 5,487,929 A | 1/1996 | Rusincovitch, Jr. et al. |
| 5,489,359 A | 2/1996 | Yamane |
| 5,490,893 A | 2/1996 | Enlow et al. |
| 5,498,305 A | 3/1996 | Mailloux |
| 5,506,031 A | 4/1996 | Spain et al. |
| 5,518,786 A | 5/1996 | Johnson et al. |
| 5,523,129 A | 6/1996 | McGeehan-Hatch |
| 5,571,557 A | 11/1996 | De Bastiani et al. |
| 5,573,865 A | 11/1996 | Steelman et al. |
| 5,591,290 A | 1/1997 | Walter et al. |
| 5,591,513 A | 1/1997 | Mahling |
| 5,595,626 A | 1/1997 | Yokouchi et al. |
| 5,620,772 A | 4/1997 | Taniguchi |
| 5,633,078 A | 5/1997 | Kamiyama |
| 5,633,225 A | 5/1997 | Fredj et al. |
| 5,639,539 A | 6/1997 | DeProspero et al. |
| 5,641,835 A | 6/1997 | Smith et al. |
| 5,643,668 A | 7/1997 | Calhoun et al. |
| 5,658,646 A | 8/1997 | Takano et al. |
| 5,662,977 A | 9/1997 | Spain et al. |
| 5,665,458 A | 9/1997 | Mahn, Jr. |
| 5,670,014 A | 9/1997 | Mendelovich et al. |
| 5,676,787 A | 10/1997 | Rusincovitch et al. |
| 5,681,631 A | 10/1997 | Steelman et al. |
| 5,683,805 A | 11/1997 | Oita et al. |
| 5,707,482 A | 1/1998 | Fusselman |
| 5,707,697 A | 1/1998 | Spain et al. |
| 5,725,712 A | 3/1998 | Spain et al. |
| 5,728,469 A | 3/1998 | Mann et al. |
| 5,741,620 A | 4/1998 | Holmes et al. |
| 5,750,234 A | 5/1998 | Johnson et al. |
| 5,750,254 A | 5/1998 | Starkey |
| 5,773,112 A | 6/1998 | Tachikawa et al. |
| 5,785,790 A | 7/1998 | Olsen et al. |
| 5,788,796 A | 8/1998 | Look et al. |
| 5,795,636 A | 8/1998 | Keller et al. |
| 5,814,402 A | 9/1998 | Smith |
| 5,851,931 A | 12/1998 | DeRenzo et al. |
| 5,852,121 A | 12/1998 | Steelman et al. |
| 5,853,876 A | 12/1998 | Takano et al. |
| 5,866,220 A | 2/1999 | Rusincovitch et al. |
| 5,891,294 A * | 4/1999 | Shih et al. ................ 156/307.7 |
| 5,897,742 A | 4/1999 | Semmler |
| 5,904,968 A | 5/1999 | Langan |

| | | | | | | |
|---|---|---|---|---|---|---|
| 5,906,883 | A | 5/1999 | Blanc-Brude | 6,838,507 B2 * | 1/2005 | Chou et al. ............... 524/445 |
| 5,916,643 | A | 6/1999 | Spain et al. | 6,866,383 B2 | 3/2005 | Naik et al. |
| 5,919,537 | A | 7/1999 | Niazy | 6,872,268 B2 | 3/2005 | David et al. |
| 5,939,479 | A | 8/1999 | Reaves et al. | 6,875,800 B2 | 4/2005 | Vanier et al. |
| 5,985,079 | A | 11/1999 | Ellison | 6,916,532 B2 | 7/2005 | Yanagiuchi |
| 5,989,707 | A | 11/1999 | Takizawa et al. | 6,929,846 B2 | 8/2005 | Kamiyama |
| 6,020,062 | A | 2/2000 | Questel et al. | 6,955,124 B2 | 10/2005 | Ciaramitaro et al. |
| 6,042,678 | A | 3/2000 | Johnson | 6,984,429 B2 | 1/2006 | Thunhorst et al. |
| 6,083,616 | A | 7/2000 | Dressler | 7,141,133 B2 | 11/2006 | Kesti et al. |
| 6,086,995 | A | 7/2000 | Smith | 2001/0006714 A1 | 7/2001 | Bull et al. |
| 6,096,396 | A | 8/2000 | Patton et al. | 2002/0127361 A1 | 9/2002 | Sandt et al. |
| 6,129,965 | A | 10/2000 | Langan | 2002/0142155 A1 | 10/2002 | Steinberg |
| 6,153,283 | A | 11/2000 | Pierson et al. | 2002/0182955 A1 | 12/2002 | Weglewski et al. |
| 6,193,918 | B1 | 2/2001 | McGuire et al. | 2002/0197398 A1 | 12/2002 | Scholz et al. |
| 6,194,064 | B1 | 2/2001 | Keely et al. | 2003/0026932 A1 | 2/2003 | Johnson et al. |
| 6,214,453 | B1 | 4/2001 | Kano | 2003/0116265 A1 | 6/2003 | Anderson et al. |
| 6,214,485 | B1 | 4/2001 | Barnett et al. | 2003/0134114 A1 | 7/2003 | Pallotta et al. |
| 6,221,198 | B1 | 4/2001 | Gryska et al. | 2003/0150547 A1 | 8/2003 | Kesti et al. |
| 6,221,485 | B1 | 4/2001 | Sanchez et al. | 2003/0157287 A1 | 8/2003 | Song |
| 6,228,486 | B1 | 5/2001 | Kittel et al. | 2003/0211334 A1 | 11/2003 | Jones |
| 6,235,363 | B1 | 5/2001 | Bilodeau | 2004/0076788 A1 | 4/2004 | Steinhardt et al. |
| 6,248,427 | B1 | 6/2001 | Ast | 2004/0101647 A1 | 5/2004 | Pitzen |
| 6,296,732 | B1 | 10/2001 | Enlow et al. | 2004/0126529 A1 | 7/2004 | Squier et al. |
| 6,311,399 | B1 | 11/2001 | Steelman et al. | 2004/0159969 A1 | 8/2004 | Truog et al. |
| 6,312,777 | B1 | 11/2001 | Smith | 2004/0161564 A1 | 8/2004 | Truog et al. |
| 6,322,874 | B1 | 11/2001 | Steelman et al. | 2004/0161566 A1 | 8/2004 | Truog et al. |
| 6,324,811 | B1 | 12/2001 | Gauss et al. | 2004/0161567 A1 | 8/2004 | Truog et al. |
| 6,336,988 | B1 | 1/2002 | Enlow et al. | 2004/0161568 A1 | 8/2004 | Truog et al. |
| 6,349,754 | B1 | 2/2002 | Johnson | 2004/0170855 A1 | 9/2004 | Kawabata |
| 6,352,769 | B1 | 3/2002 | Mori | 2004/0200564 A1 | 10/2004 | Kinsey et al. |
| 6,364,992 | B1 | 4/2002 | Nambu et al. | 2004/0247837 A1 | 12/2004 | Enlow et al. |
| 6,376,058 | B1 | 4/2002 | Schut et al. | 2004/0253421 A1 | 12/2004 | Truog et al. |
| 6,379,791 | B1 | 4/2002 | Cernohous et al. | 2004/0253422 A1 | 12/2004 | Truog et al. |
| 6,383,613 | B1 | 5/2002 | Takeda | 2004/0253423 A1 | 12/2004 | Truog et al. |
| 6,394,165 | B1 | 5/2002 | Rader | 2005/0003129 A1 | 1/2005 | Truog et al. |
| 6,399,193 | B1 | 6/2002 | Ellison | 2005/0092420 A1 | 5/2005 | Kinne et al. |
| 6,413,630 | B1 | 7/2002 | Nakayama | 2005/0175818 A1 | 8/2005 | Kawabata et al. |
| 6,421,052 | B1 | 7/2002 | McGuire | 2005/0196607 A1 | 9/2005 | Shih et al. |
| 6,432,241 | B1 | 8/2002 | Congard et al. | 2005/0255271 A1 | 11/2005 | Brimo |
| 6,432,528 | B1 | 8/2002 | Faust et al. | 2006/0003114 A1 | 1/2006 | Enlow et al. |
| 6,447,630 | B1 | 9/2002 | Disano et al. | 2006/0029765 A1 | 2/2006 | Truog et al. |
| 6,461,422 | B1 | 10/2002 | Yang et al. | 2006/0046027 A1 | 3/2006 | Kaminski et al. |
| 6,474,389 | B1 | 11/2002 | Steelman et al. | 2006/0046028 A1 | 3/2006 | Kaminski et al. |
| 6,475,616 | B1 | 11/2002 | Dietz et al. | 2006/0046083 A1 | 3/2006 | Steinhardt et al. |
| 6,482,488 | B1 | 11/2002 | Janssen et al. | 2006/0051571 A1 | 3/2006 | Steinhardt et al. |
| 6,482,638 | B1 | 11/2002 | Patil et al. | 2006/0073318 A1 | 4/2006 | Tuttle et al. |
| 6,493,918 | B1 | 12/2002 | Bell et al. | 2006/0088695 A1 | 4/2006 | Coburn |
| 6,509,075 | B1 | 1/2003 | McCurry et al. | 2006/0093776 A1 | 5/2006 | Crum |
| 6,514,624 | B2 | 2/2003 | Takemoto | 2006/0165979 A1 * | 7/2006 | Kinsey et al. ............... 428/343 |
| 6,520,234 | B1 | 2/2003 | Anderson et al. | | | |
| 6,541,109 | B1 | 4/2003 | Kumar et al. | | FOREIGN PATENT DOCUMENTS | |
| 6,554,044 | B2 | 4/2003 | Paulson et al. | | | |
| 6,576,327 | B1 | 6/2003 | Weissmann et al. | DE | 35 43 777 A1 | 6/1987 |
| 6,579,601 | B2 | 6/2003 | Kollaja et al. | DE | 197 35 958 A1 | 2/1999 |
| 6,613,181 | B2 | 9/2003 | Steelman et al. | DE | 198 37 774 A1 | 2/2000 |
| 6,613,411 | B2 | 9/2003 | Kollaja et al. | EP | 0 032 258 A1 | 7/1981 |
| 6,617,008 | B1 | 9/2003 | Kono et al. | EP | 0 103 407 A1 | 6/1986 |
| 6,630,049 | B2 | 10/2003 | Hannington et al. | EP | 0 216 230 A2 | 4/1987 |
| 6,645,328 | B2 | 11/2003 | Anderson et al. | EP | 0 238 301 A1 | 9/1987 |
| 6,649,003 | B1 | 11/2003 | Spain et al. | EP | 0 103 344 B1 | 10/1988 |
| 6,649,318 | B1 * | 11/2003 | Gao et al. ............... 430/138 | EP | 0 395 814 A2 | 11/1990 |
| 6,649,682 | B1 | 11/2003 | Breton et al. | EP | 0 233 633 B1 | 12/1991 |
| 6,703,089 | B2 | 3/2004 | DeProspero | EP | 0 480 892 A1 | 4/1992 |
| 6,706,131 | B2 | 3/2004 | Steelman et al. | EP | 0 266 224 B1 | 3/1993 |
| 6,709,723 | B2 | 3/2004 | Roys et al. | EP | 0 561 086 A | 9/1993 |
| 6,723,427 | B1 | 4/2004 | Johnson et al. | EP | 000569921 A1 * | 11/1993 |
| 6,740,379 | B1 | 5/2004 | Congard et al. | EP | 0 384 252 B1 | 8/1994 |
| 6,756,095 | B2 | 6/2004 | Sandt et al. | EP | 0 623 477 A2 | 11/1994 |
| 6,773,653 | B2 | 8/2004 | Miller et al. | EP | 0 487 724 B1 | 9/1995 |
| 6,783,816 | B2 | 8/2004 | Golub et al. | EP | 0 695 629 A2 | 2/1996 |
| 6,805,048 | B2 | 10/2004 | Pearson et al. | EP | 0 381 349 B1 | 7/1996 |
| 6,808,586 | B2 | 10/2004 | Steinhardt | EP | 0 473 254 B1 | 8/1996 |
| 6,824,638 | B1 | 11/2004 | Anderson et al. | EP | 0 803 351 A1 | 10/1997 |

| | | |
|---|---|---|
| EP | 0 619 184 B1 | 7/1998 |
| EP | 0 658 175 B1 | 10/1998 |
| EP | 0 893 247 A1 | 1/1999 |
| EP | 0 638 019 B1 | 1/2000 |
| EP | 0 578 957 B1 | 8/2000 |
| EP | 1 038 665 A1 | 9/2000 |
| EP | 0 569 921 B1 | 11/2000 |
| EP | 1 055 514 A2 | 11/2000 |
| EP | 1 093 911 A2 | 4/2001 |
| EP | 1 053 793 B1 | 3/2002 |
| EP | 1 201 422 A2 | 5/2002 |
| EP | 1 203 968 A1 | 5/2002 |
| EP | 1 047 556 B1 | 7/2002 |
| EP | 1 226 958 A1 | 7/2002 |
| EP | 0 752 498 B1 | 6/2003 |
| EP | 1 169 180 B1 | 7/2003 |
| EP | 1 342 565 A1 | 9/2003 |
| EP | 1 023 169 B1 | 11/2003 |
| EP | 1 034 090 B1 | 12/2003 |
| EP | 0 993 876 B1 | 3/2004 |
| EP | 1 318 011 B1 | 9/2004 |
| EP | 1 462 423 A1 | 9/2004 |
| EP | 1 518 716 A1 | 3/2005 |
| EP | 1 377 646 B1 | 8/2005 |
| EP | 1 018 533 B1 | 12/2005 |
| GB | 1 232 971 | 5/1971 |
| JP | 49039997 * | 4/1974 |
| JP | 49039997 A | 4/1974 |
| JP | 08/034959 A1 | 6/1996 |
| JP | 10/278187 A1 | 1/1999 |
| JP | 2005-206724 A | 8/2005 |
| JP | 2005-220337 A | 8/2005 |
| WO | WO 90/00788 A1 | 1/1990 |
| WO | WO 92/13712 A1 | 8/1992 |
| WO | WO 94/03337 A2 | 2/1994 |
| WO | WO 94/09983 A1 | 5/1994 |
| WO | WO 95/17312 A1 | 6/1995 |
| WO | WO 99/19149 A1 | 4/1999 |
| WO | WO 99/37479 A1 | 7/1999 |
| WO | WO 99/64235 A1 | 12/1999 |
| WO | WO 00/01527 A1 | 1/2000 |
| WO | WO 00/50234 A1 | 8/2000 |
| WO | WO 00/56556 A1 | 9/2000 |
| WO | WO 01/00411 A1 | 1/2001 |
| WO | WO 01/10948 * | 1/2001 |
| WO | WO 01/79372 A2 | 10/2001 |
| WO | WO 03/053719 A2 | 7/2003 |
| WO | WO 03/062341 A2 | 7/2003 |
| WO | WO 03/066761 A2 | 8/2003 |
| WO | WO 03/095238 A1 | 11/2003 |
| WO | WO 2004/062903 A2 | 7/2004 |
| WO | WO 2004/074007 A2 | 9/2004 |
| WO | WO 2004/074008 A2 | 9/2004 |
| WO | WO 2005/007397 A1 | 1/2005 |
| WO | WO 2005/075591 A1 | 8/2005 |
| WO | WO 2005/105429 A1 | 11/2005 |

OTHER PUBLICATIONS

U.S. Appl. No. 11/393,506, filed Mar. 30, 2006, Kinsey et al.
U.S. Appl. No. 60/778,832, filed Mar. 3, 2006, Steinhardt et al.
U.S. Appl. No. 60/779,191, filed Mar. 3, 2006, Westendorf et al.
U.S. Appl. No. 60/778,996, filed Mar. 3, 2006, Westendorf et al.
U.S. Appl. No. 11/413,543, filed Apr. 28, 2006, Westendorf et al.
U.S. Appl. No. 60/849,052, filed Oct. 3, 2006, Zeik et al.
U.S. Appl. No. 60/849,053, filed Oct. 3, 2006, Zeik et al.
Millikin & Company, "180 Walls", Jul. 18, 2006, Milliken & Company website www.180walls.com, home page, pages showing different patterns, and Frequently Asked Questions pages.
Nopar International, "Folio Contact: We stick to your ideas!", "Products—FolioContact—FAQ", "Data Sheet Folio Contact Gridded/Squared, imprinted for permanent markers and white for non-permanent markers", NOPAR International GmbH website, www.jet-contact.com, downloaded Mar. 19, 2007, NOPAR International GmbH, Bremen, Germany.
Fix-It Club, "How to Hang Wallpaper," http://home.howstuffworks.com, copyright 1998-2007, web pages printed Jan. 24, 2007, pp. 1-13, published on the internet by HowStuffWorks.com, c/o The Convex Group, Atlanta, GA, U.S.A.
Author Unknown, Avery Dennison198 "Find a Solution" Architectural film product information from website www.averydennison.com, copyright 1996-2007, web pages printed Feb. 6, 2007, Avery Dennison Corporation, Pasadena, CA U.S.A.
Author Unknown, DI-NOC™ Film Planning Guide, pp. 1-32, http://solutions.3m.com/wps/portal/3M/en_US/Graphics/Scotchprint/Solutions/Di-NocFilm/Bulletins/, date of publication unknown, Minnesota Mining and Manufacturing Company (3M), St. Paul, MN, U.S.A.
Author Unknown, DI-NOC™ Film Product Bulletin D1, pp. 1-5, http://solutions.3m.com/wps/portal/3M/en_US/Graphics/Scotchprint/Solutions/Di-NocFilm/Bulletins/, Aug. 2006, Minnesota Mining and Manufacturing Company (3M), St. Paul, MN, U.S.A.
Author Unknown, "Application of 3M™ DI-NOC™ Films, A Guide for Indoor and Outdoor Dry Applications, Instruction Bulletin 5.41", pp. 1-8, www.3m.com/intl/PH/downloads/Dinoc.pdf, Aug. 2006, Minnesota Mining and Manufacturing Company (3M), St. Paul, MN, U.S.A.
Author Unknown, "Instalacion de DI-NOC", pp. 1-27, http://www.pavimentosonline.com/3M/DINOC/index.htm, first date of publication unknown, downloaded Aug. 7, 2006, Minnesota Mining and Manufacturing Company (3M), St. Paul, MN, U.S.A.

* cited by examiner

DISCOLORATION-RESISTANT ARTICLES FOR APPLYING COLOR ON SURFACES AND METHODS OF REDUCING DISCOLORATION IN ARTICLES FOR APPLYING COLOR ON SURFACES

FIELD OF THE INVENTION

The invention relates to articles and methods for applying color on a surface and, more particularly, to articles for applying color to a surface that resist discoloration arising from transfer of extraneous agents, such as extraneous dyes and pigments, from the surface to which the article is applied and methods of mitigating or preventing the transfer of extraneous agents responsible for the discoloration.

BACKGROUND OF THE INVENTION

Thin sheets of visually-perceivable color effects, such as a dry color component, may be adhesively secured to a surface by a bonding layer, typically adhesive, for applying color. Foreign substances or agents in or on the surface, such as pigments in a paint coating, may be solubilized (i.e., dissolve) into the bonding layer and transferred as a permeant to the sheet of visually-perceivable color effects. The presence of certain extraneous agents, originating from the surface and transferred to the sheet, in the sheet of visually-perceivable color effects may result in discoloration of the color effect provided by the article. For example, discoloration may be produced by organic pigments found in common wall paints that are partially solubolized by the bonding layer and subsequently migrate through the bonding layer into the sheet of visually-perceivable color effects. For example, the sheet may be yellowed by the migration of mono-azo based pigments from the surface. Often, the sheet of visually-perceivable color effects includes a topcoat that may inhibit volatilization and release of the extraneous agent from the article and, thereby, hasten accumulation of the extraneous agent in the sheet and the concomitant discoloration. The concentration of the extraneous agent in the sheet of visually-perceivable color effects and, hence, the degree of discoloration increases over the lifetime of the article. Elevated temperature and low molecular weight components in the paint such as ethylene glycol, coalescing aids, and water may accelerate the transfer of the extraneous agent, which would likewise accelerate the discoloration.

SUMMARY OF THE INVENTION

In accordance with the principles of the invention, an article is provided for conveying visually-perceivable color effects to a surface containing an extraneous agent. The article generally includes a sheet of visually-perceivable color effects, a bonding agent carried by the sheet capable of bonding the sheet to the surface, and a releasable liner removably covering the sheet. In one aspect of the invention, the article may include a barrier layer disposed between the sheet and the bonding agent. The barrier layer is effective for reducing transfer of the extraneous agent from the surface to the sheet. In various specific embodiments, the barrier layer may include a glass-coated polymer, a ceramic-coated polymer, a sodium silicate-containing composition, at least one of an anionic layer and a cationic layer, or a nanocomposite. The barrier layer may optionally incorporate a non-woven material, a metallized material, a cellulosic material, and/or a polymer layer.

Alternatively or in addition to the barrier layer, the sheet, the bonding agent, a tie layer, and/or the barrier layer of the article may include a scavenger material capable of scavenging the extraneous agent to reduce transfer of the extraneous agent from the surface to the sheet. In yet other alternative embodiments, the sheet, the bonding agent, a tie layer, and/or the barrier layer of the article may include a neutralizing agent capable of modifying the extraneous agent to reduce transfer of the extraneous agent from the surface to the sheet. In yet another embodiment of the invention, an article for conveying visually-perceivable color effects to a surface containing a extraneous agent, the bonding agent of the article has a solubility for the extraneous agent that differs substantially from a solubility of the extraneous agent in the surface. In yet another embodiment of the invention, the bonding agent controls discoloration.

In accordance with the invention, a method is provided for preventing and reducing the discoloration of a layered article for conveying visually-perceivable color effects. The method includes adapting the layered article for application to a surface containing an extraneous agent and modifying the layered article to reduce the transfer of the extraneous agent from the surface to a portion of the layered article providing the visually-perceivable color effects by either adding a barrier layer, a scavenger material, and/or a neutralizing agent to one or more layers of the layered article, or by adjusting a solubility of the extraneous agent in one or more layers of the layered article to differ substantially from a solubility of the extraneous agent in the surface.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

The invention is directed to articles and methods for applying color on a surface in which the material providing the color is protected against discoloration arising from extraneous agents migrating, diffusing or blooming from the surface to which the article is applied into the portion of the article supplying the color. As employed herein, the term "color" is used to refer to a color effect, i.e., a difference in color perception. In a specific embodiment, the color effect is a substantially permanent color effect, i.e., a color effect which is not removed or noticeably reduced upon casual contact, light washing, or the like. Thus, a substantially permanent color effect is distinguished from a temporary color effect which can be easily removed or reduced, such as that provided by chalk or crayons. The term "color component" is used herein to refer to the component of the inventive articles that provides the color effect. A topcoat or overcoat may also be applied over the color layer. It is to be understood that, in use, the article may provide other functional effects to the surface as well. The primary function of the article is not limited to providing color or other aesthetic effects.

The term "surface" is used herein to refer to any outer layer or boundary of an object or substrate which is capable of receiving a color component thereon. Suitable surfaces may be substantially two-dimensional and flat or substantially three-dimensional and including curves, angled portions or the like. In one embodiment, the surface to which color component is applied using the articles and methods of the invention comprises an architectural surface, i.e., a surface of a building, a building fixture (i.e., appliances), furniture, and the like. The architectural building surface may be an interior surface within the building or an exterior surface on an outer portion of the building. Substantially three-dimensional architectural surfaces can include, for example, edge treatments of two-dimensional surfaces such as moldings (e.g., moldings around windows or doorways), floorboards, appliances, furniture, floors, counters, and the like. The architectural surface may be permanently installed or may be temporarily installed or portable. The products of the present invention can further be applied to surfaces of articles to give them the same or different texture and/or appearance of architectural surfaces. For example, the products hereof can be used to apply a color layer to appliances, furniture, and other architectural articles. Additional surfaces suitable for application of color using the articles and methods of the present invention will be apparent to those skilled in the art in view of the present disclosure.

Figure 1:
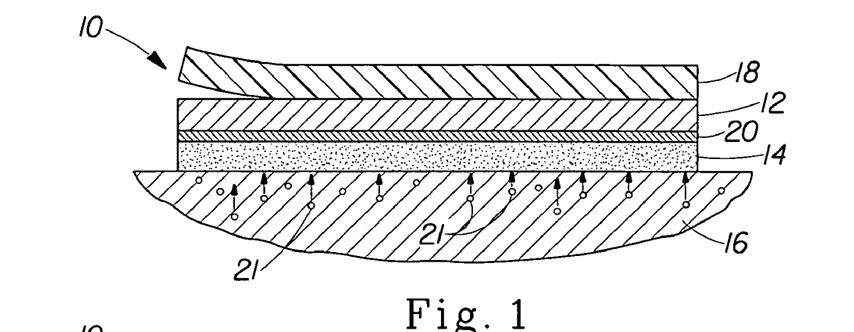
FIG. 1 is a diagrammatic view of an article for applying color to a surface in accordance with one embodiment of the invention.

With reference to FIG. 1 and in accordance with the principles of the invention, an article 10 for applying color on a surface 16 comprises a sheet 12 of visually-perceivable color effects, such as a dry color component, a bonding agent 14, such as an adhesive, a releasable liner 18 covering the sheet 12, and a barrier layer 20 situated between the bonding agent 14. The sheet may include a topcoat 15 formed of any suitable material including, but not limited, polymers such as polyurethanes, polyvinyl chlorides, polyvinylidine fluorides, polyacrylates, cellulosic materials and the like, as well as blends and copolymers thereof. The bonding agent is any substance capable of adhering the sheet 12 to the surface 16 at the ambient temperature of environment of the article 10. In certain embodiments of the invention, the sheet 12 may have a thickness of less than or equal to about 0.0033 inch (3.3 mils or 0.084 mm).

The releasable liner 18 is removable and is intended, and adapted, for removal simultaneously with application, or subsequent to application, of the sheet 12 to the surface 16. Typically, the releasable liner 18 is removed by peeling liner 18 from sheet 12. The releasable liner 18 provides structural support and/or strength to the sheet 12, for example when the releasable liner is in film form, and/or to facilitate handling of the article during manufacture, storage and use and may optionally be used to convey a finish to the sheet 12.

Exemplary articles 10 are described in commonly-assigned application Ser. No. 10/324,237 entitled "Articles and Methods for Applying Color on Surfaces," which Published as U.S. Patent Application Publication US 2003/0134114 A1 the disclosure of which is hereby incorporated by reference herein in its entirety. As described therein, among other things, in embodiments wherein the article comprises the sheet of dry color component and adhesive, in the absence of layers such as liners or carriers, the thickness of the articles will be essentially that of the sheet of dry color component, as the adhesive layer is typically relatively thin, i.e., generally less than about 1 mil (0.001 inch or 0.03 mm) in thickness, more specifically about 0.5 mil (0.0005 inch or 0.013 mm) in thickness. Thus, in one embodiment, the sheet of dry color component and adhesive combined have a thickness of about 0.003 inch (3 mils or 0.08 mm) or less, more specifically from about 0.0003 inch to about 0.003 inch (about 0.008 mm to about 0.08 mm), even more specifically from about 0.0003 to about 0.0015 inch (about 0.008 mm to about 0.04 mm), and yet more specifically about 0.0007 inch (0.013 mm) or less. Advantageously, edges of adjacent sheets may thus be overlapped without significant overlap appearance. In further embodiments wherein one or more releasable liners are included, the thickness of the articles will be increased.

In addition, the dry color component of the articles may exhibit a minimum level of elasticity sufficient to allow bending, rolling, or similar manipulations of the sheets without causing cracking, breaking or other damage to continuous areas of the dry color component. In one embodiment, the articles of the invention also exhibit less than 50% elongation when measured according to ASTM D882 using a 1.0 inch (2.54 cm) wide sample and a 2.0 inch gauge length at a crosshead speed of 20 in/min (50.8 cm/min). Generally, elongation is measured at room temperature which, as used herein, refers to temperatures less than about 100° F. (38° C.). Typically, the elongation as described above is exhibited at temperatures of from about 40° F. (4° C.) to about 95° F. (35° C.), more specifically at about 60° F. (15° C.) to about 80° F. (27° C.). In further embodiments, the articles exhibit 25% or less elongation, according to ASTM D882 as described.

The sheet of dry color component may also exhibit sufficient conformability to adapt to the form of the surface to be colored. In addition, the sheet of dry color component may be sufficiently conformable to allow the articles to be easily manipulated around and/or into corners and other three-dimensional configurations. Further, the sheet of the dry color component may be microconformable. As used herein, microconformability refers to the ability of the articles to become similar in form or character to the surface to which they are adhered, whereby, upon application, the sheet of dry color component will closely mimic the texture of the underlying surface to provide a paint-like appearance. The conformability and microconformability are preferably exhibited at room temperature as defined above.

References herein to terms such as "vertical", "horizontal", "under", "over", etc. are made by way of example, and not by way of limitation, to establish a frame of reference. It is understood various other frames of reference may be employed without departing from the spirit and scope of the invention.

With continued reference to FIG. 1, the barrier layer 20, may be a prophylactic barrier layer 20 and operates to either eliminate or, at the least, substantially retard the transfer, by mechanisms including but not limited to diffusion and migration, into the sheet 12 of a extraneous (e.g., foreign) substance or agent, diagrammatically shown and labeled with reference numeral 21 in FIG. 1, originating from the surface 16 to be colored. The extraneous agent 21 is understood to be an agent that would be extraneous by its presence with a finite concentration in sheet 12 or would be considered extraneous by increasing an existing concentration of the agent normally present in sheet 12. One such extraneous agent 21 is an organic pigment or dye present in an existing layer, such as an existing paint layer, residing on or covering the surface 16 before the article 10 is applied and with which the bonding agent 14 is mechanically coupled for bonding the article 10 to the surface 16.

The barrier layer 20 may act as a physical barrier that blocks, prohibits or otherwise prevents transfer by defining an impervious or impermeable barrier to the passage or permeation of the extraneous agent 21 so as to prevent or lessen degradation of a property of the article 12, such as preventing the occurrence of discoloration. Alternatively, the barrier layer 20 may slow or retard the transfer rate of the extraneous agent 21 so that a property of sheet 12, such as color, is not perceptibly affected over at least the lifetime of the article 10 for providing surface 16 with color. The thickness and properties of the barrier layer 20 are adjusted to provide the desired blocking or retardation. The barrier layer 20 has a thickness less than or equal to about 0.0025 (2.5 mils or 0.064 mm) and, in certain embodiments of the invention, the barrier layer 20 may be 0.001 inch (0.1 mils or 0.025 mm) or thinner.

The barrier layer 20 is illustrated in FIG. 1 as being incorporated as an identifiable layer, stratum or lamina in the layered structure of article 10. In an alternative embodiment of the invention, a barrier layer 20a, characterized by properties identical to barrier layer 20, may be incorporated as a component of the bonding agent 14. In yet another alternative embodiment, a barrier layer 20b, characterized by properties identical to barrier layer 20, may be incorporated as a component of the sheet 12. The barrier layers 20a and 20b may be segregated as a layer, stratum or lamina positioned within the thickness of the bonding agent 14 or sheet 12, respectively, or may be distributed uniformly throughout the thickness of the corresponding one of the bonding agent 14 or sheet 12. The barrier layers 20, 20a and 20b may be employed individually or incorporated into article 10 in any permutation or combination. Each of the barrier layers 20, 20a and 20b may combine two or more of the candidate materials described herein. The properties of barrier layer 20 described herein are understood to apply equally to barrier layers 20a and 20b.

Generally, the characteristics and properties required for the barrier layer 20 will depend among other things upon the identity of the extraneous agent 21 and its transport mechanism in the barrier layer 20. Several factors are known to influence transport properties of an agent, such as extraneous agent 21, in a material, such as barrier layer 20. The chemical nature of the polymers forming barrier layer 20 influences transport as extraneous agent transfer is believed decrease with increasing strength of the forces holding the polymer chains together. The polymer backbone is recognized to be an important factor in determining the chain-to-chain forces. Polymer chains have to move aside, or open up, to permit agent transfer or permeation. Polymers with hydroxyl, cyano, halogen, ester, and amide linkages are exemplary candidate materials for barrier layer 20, although the invention is not so limited. Generally, any polymer having a glass transition temperature that exceeds the ambient temperature conditions of the environment of the surface 16 to which article 10 is applied will have adequate chain-to-chain force strength.

Another factor influencing the transport of extraneous agent 21 in barrier layer 20 is the susceptibility of the polymer forming the barrier layer 20 to moisture. The barrier properties of polar materials that depend on hydrogen bonding for their barrier properties will diminish in the presence of water. Water swells the polymer, which reduces the chain-to-chain forces and allows permeation. Polymers characterized by such polar linkages include, but are not limited to, esters and cyano.

Yet another factor that affects the transport of extraneous agent 21 in barrier layer 20 is the degree of packing, crystallinity, and orientation of a polymer constituting barrier layer 20. Increasing the crystallinity of barrier layer 20 improves barrier properties as the free volume decreases. Increasing the orientation also improves barrier properties, as the path for agent transfer becomes more tortuous path. However, material stiffness also increases with increasing crystallinity and orientation, which reduces the flexibility of the article 10.

Yet another factor that influences the transport of extraneous agent 21 in barrier layer 20 is the nature of the polymer surface contacting the sheet 12 or bonding agent 14. Hydrophilic or hydrophobic surfaces and/or polar or nonpolar surfaces can prevent or, at the least reduce or retard, the transfer of the extraneous agent 21 from surface 16.

Another factor influencing the transport of extraneous agent 21 in barrier layer 20 is the presence of additives and modifiers. Additives typically act to reduce the chain-to-chain forces making the polymers flexible and, therefore, increasing permeation. Blending a polymer with poor barrier properties with one that has acceptable barrier properties will increase the barrier of the poor barrier material.

In one specific embodiment of the invention, the barrier layer 20 has a composition of about 3 percent by weight to about 40 percent by weight water-glass or sodium silicate ($Na_2Si_4O_2$), about 3 percent by weight to about 40 percent by weight polymer, and about 20 percent by weight to about 24 percent by weight water. The use of sodium silicate as a barrier layer is described in U.S. Pat. Nos. 1,365,715 and 5,460,855, the disclosures of which are hereby incorporated by reference herein in their entirety. The polymer in the composition lends flexibility to such barrier layers 20 and the presence of water dilutes the composition to facilitate a coating application process. Sodium silicate is manufactured by combining or fusing various ratios of sand and soda ash (i.e., sodium carbonate) at high temperature.

In another specific embodiment of the invention, the barrier layer 20 includes at least one of an anionic layer and a cationic layer capable of capturing or trapping the extraneous agent 21. One technique appropriate for incorporating such anionic and cationic layers into article 10 is by coating sheet 12 with an aqueous dispersion. Suitable cationic and anionic aqueous dispersions are described in U.S. Pat. No. 6,576,327, the disclosure of which is hereby incorporated by reference herein in its entirety. Specific cationic and anionic aqueous dispersions are commercially available, for example, from BASF Aktiengesellschaft (Ludwigshafen, Germany) under the tradenames ACRONAL®, BUTONAL®, STYROFAN®, and PROPIOFAN®. The anionic layers are effective for capturing extraneous agents 21 that are positively charged and cationic layers are effective for capturing extraneous agents 21 that are negatively charged. Frequently, the barrier layer 20 may be constituted by a bilayer or multi-layer structure consisting of spatially-separated anionic and cationic layers so that, regardless of the charge state of the extraneous agent 21, all charged extraneous agent particles are captured and secured against migration into sheet 12. For example, an upstream anionic layer would capture positively-charged extraneous agent particles and transmit negatively-charged foreign particles for capture by a downstream cationic layer more distant from surface 16. Alternatively, the cationic layer of the bilayer or multi-layer structure may be disposed upstream of the anionic layer. Alternatively, either the anionic or cationic layer may be provided in, or mixed as a component of, the bonding agent 14 and the other of the anionic or cationic layer is provided as a separate layer.

In yet another specific embodiment of the invention, the barrier layer 20 is a glass-coated polymer. Suitable glass-coated polymers include, but are not limited to, aluminum oxide-coated polyethyleneterephthalate polymers and copolymers, aluminum oxide-coated polypropylene polymers and copolymers, aluminum oxide-coated nylon polymers and copolymers, and combinations of these materials. Such glass coatings are typically transparent inorganic materials. Such glass coatings may be applied, for example, by a plasma-based deposition process.

In yet another specific embodiment of the invention, the barrier layer 20 is a ceramic-coated polymer. One suitable coating material is silicon oxide ($SiO_x$), which may be stoichiometric or non-stoichiometric, that may be deposited by a chemical vapor deposition process using silane as a precursor source. Suitable ceramic-coated materials include, but are not limited to, silicon oxide-coated oriented polypropylene, silicon oxide-coated polyethyleneterephthalate, silicon oxide-coated oriented polyvinyl alcohol, silicon oxide-coated polypropylene, silicon oxide-coated polyethylene, and combinations thereof.

In yet another specific embodiment of the invention, the barrier layer 20 is a nanoclay-based composite material or plastic nanocomposite that creates a tortuous path that the extraneous agent 21 must successfully traverse to reach the sheet 12. The nanoclay-based composite material is formed by dispersing nanoclay platelet particles, tactoids of individual platelet particles, aggregates of tactoids, or mixtures thereof in a polymer host matrix. The nanoclay platelet particles are arranged a sheet-like structure having the form of a plurality of adjacent, bound layers, in which the planar dimensions are significantly larger than the structure's thickness. In certain embodiments of the invention, the nanoclay loading in the host polymer resin may be greater than about 0.5 percent by weight. In other embodiments of the invention, the nanoclay loading in the host polymer resin may range from about 0.5 percent by weight to about 25 percent by weight. In any event, the nanoclay loading is sufficient to define a tortuous path through the host polymer resins. The individual platelet particles may have a thickness of less than about 2 nm and a diameter in the range of from about 10 nm to about 5000 nm.

The nanoclay platelet particles may be composed of any suitable organic or inorganic material and, in particular, may be composed of a phyllosilicate. Natural phyllosilicates suitable for use in the invention include, but are not limited to smectite clays, such as montmorillonite, saponite, hectorite, mica, vermiculite, bentonite, nontronite, beidellite, volkonskoite, magadite, and kenyaite. Synthetic phyllosilicates suitable for use in the invention include, but are not limited to, synthetic mica, synthetic saponite, and synthetic hectorite. Either synthetic or natural phyllosilicates may be modified by fluorination or by the addition of an organic cation. Phyllosilicates suitable for use in the invention are commercially available from various sources, including Nanocor, Inc. (Arlington Heights, Ill.). Host polymer resins suitable for the matrix include, but are not limited to, polyamide polymers and copolymers, polyethyleneterephthalate polymers and copolymers, polypropylene polymers and copolymers, and combinations thereof. The nanoclay platelet particles may be derived from natural, synthetic, and modified phyllosilicates, which may be treated to allow incorporation of organic cations.

Another nanoclay-based polymer material suitable for use in the invention is the AEGIS Nanocomposite Barrier Resin, commercially available from Honeywell, which is based upon nylon 6.

Other inorganic platelet particles suitable for use in the nanocomposite include aluminum or zinc platelets that have a thickness of about 3 μm to 10 μm and a diameter of about 4 μm to 17 μm. These inorganic platelet particles may be provided in any polymer host matrix described above in an amount of between about 0.1 percent by weight and 3.5 percent by weight. Exemplary aluminum platelets are commercially available as aluminum pigment dispersions under the META-LURE® tradename from Eckhart America L. P. (Louisville, Ky.).

In yet another specific embodiment of the invention, the barrier layer 20 or sheet 12 is a formed by a polymer having a crystallinity defining the torturous path. The polymer forming barrier layer 20 should have a glass transition temperature that is greater than the temperature of the article 10 while applied to the surface 16 so that the constituent polymer has a low free volume available for migration of the extraneous agent 21.

In yet another specific embodiment of the invention, the bonding agent 14 or sheet 12 may have a solubility for the extraneous agent 21 differs substantially from a solubility of the extraneous agent 21 in the surface 16. As a result, the extraneous agent 21 is not readily transferred from the surface 16 to the bonding agent 14. If the extraneous agent is prevented from entering the bonding agent 14, then subsequent transfer cannot occur subsequently from the bonding agent 14 to the sheet 12. In this instance, the bonding agent 14 is operating as the barrier layer 20. The solubility of the extraneous agent 21 in bonding agent 14 may be altered by varying the chemistry of the adhesive to modify the bond strength between constituent molecules of the bonding agent 14.

To improve adhesion between the sheet 12 and the barrier layer 20 and/or between the bonding agent 14 and the barrier layer 20, the appropriate surfaces may be surface treated by either corona treatment, roughening of target surface for increasing surface area, swelling of target surface, intermolecular mixing or mutual diffusion, direct coating of bonding agent, applying heat or pressure during lamination, including a functionalized polymer to provide covalent or intermolecular bonds, increasing a surface area of one or more layers by embossing, brushing or other mechanical methods, or by adding particles or by solvent etching, and combinations thereof. Corona treatment, for example, involves exposing the sheet 12 to a high voltage corona discharge while passing sheet 12 between a pair of spaced electrodes.

The invention contemplates that any of the various types of barrier layers 20 described herein may be used singularly or in compatible combinations. For example, the barrier layer 20 may be constituted by a two-layer structure including a lamina of nanoclay-based composite material and a lamina containing sodium silicate.

In yet another specific embodiment of the invention, the barrier layer 20 may further include a sheet or film of a polymer that cooperates with barrier layer 20 for reducing transfer of the extraneous agent 21 from the surface 16 to the sheet 12. The polymer film may also be provided as a lamina in the layered structure of the article 10 distinct from barrier layer 20 or, alternatively, as a lamina disposed in the sheet 12 or in the bonding agent 14. In various embodiments, the polymer sheet or film is selected from the group consisting of polyvinylidene chloride polymers and copolymers, polyvinyl alcohol polymers and copolymers, ethylene vinyl alcohol polymers and copolymers, polycholorotrifluoroethylene polymers and copolymers, acrylonitrile methacrylate polymers and copolymers, polyacrylonitrile polymers and copolymers, aromatic polyamide polymers and copolymers, amorphous polyamide polymers and copolymers, polyethyleneterephthalate polymers and copolymers, polyvinyl chloride polymers and copolymers, polyvinylidene fluoride polymers, liquid crystalline polymers and copolymers, polystyrene, polyethylene, acrylic, styrene-acrylic copolymers, alkyd, polyurethane, polypropylene polymers and copolymers, oriented polypropylene polymers and copolymers, cellulosic polymers, copolymers and coatings, aliphatic polyesters, polyhydroxy alkonals, polycaprolactones, polylactic acid, and combinations thereof. The polymer film resists penetration by the extraneous agent 21 so as to assist the barrier layer 20 in blocking or limiting transfer of extraneous agent 21 to the sheet 12. The invention contemplates that sheet 12 or bonding agent 14 may include one of the listed polymers as a component so a distinct polymer layer is not required in the layered structure of the article 10.

An exemplary polyvinylidene (PVDC) polymer suitable for use as a polymer film in barrier layer 20 is commercially available under the SARAN tradename from The Dow Chemical Company (Midland, Mich.). Exemplary commercial sources of polyvinyl alcohol (PVA) include Clariant GmbH (Frankfurt, Del.) and E.I. Du Pont De Nemours & Co. (Wilmington, Del.). Exemplary ethylene vinyl alcohol copolymers are commercially available under the EVAL® tradename from Kuraray Co., Ltd. (Kurashiki City, Japan) and under the SOARNOL® tradename from Nippon Gohsei (Osaka, Japan). One suitable polycholorotrifluoroethylene (PCTFE) is commercially available under the ACLAR® tradename from Honeywell International Inc. (Morris Township, N.J.). A suitable acrylonitrile methacrylate copolymer is available commercially under the BAREX® tradename from BP, p.l.c. (London, England). An exemplary aromatic polyamide is commercially under the MDX6 tradename from Mitsubishi Gas Chemical America Inc. (New York, N.Y.) and also available commercially from sources such as Honeywell International Inc. (Morris Township, N.J.) and BASF Aktiengesellschaft (Ludwigshafen, Germany). Amorphous polyamide suitable for use in the invention is commercially available under the SELAR® PA tradename from E.I. Du Pont De Nemours & Co. (Wilmington, Del.). An exemplary liquid crystalline polymer is commercially available under the VECTRAN® tradename from Ticona (Summit, N.J.).

The polymer(s), copolymer(s) or (co)polymer blend(s) of the polymer film may optionally be crosslinked by joining adjacent chains to one another either during synthesis or by a non-reversible chemical reaction. Crosslinking may be accomplished by additive atoms or molecules that are covalently bonded to the crosslinked chains. Crosslinking may also be achieved by weaker chemical interactions, portions of crystallites, and even physical entanglement. Crosslinking may operate to improve the resistance of the barrier layer 20 to the transfer of the extraneous agent 21 from the surface 16 to which article 23 is bonded to sheet 12. The polymer film may be formed from either a thermoplastic resin that softens when exposed to heat and returns to its original condition when cooled to room temperature or a thermoset resin that sets irreversibly when heated. Thermoset polymer resins are known to be crosslinked, in contrast to thermoplastic resins.

In yet another specific embodiment of the invention, the barrier layer 20 may further incorporate a nonwoven web consisting of a web having an entangled structure of individual synthetic fibers, filaments, threads or staple length polymeric fibers composed of one or more thermoplastic polymers. The nonwoven web may also be provided as a lamina in the layered structure of the article 10 distinct from barrier layer 20 or, alternatively, as a lamina or distributed component of the sheet 12 or of the bonding agent 14. Nonwoven webs may be formed from many processes such as, for example, meltblowing processes, spunbonding processes, and bonded carded web processes. Generally, spunbond nonwoven webs are formed from consolidated structures or sheets of entangled filaments having average diameters typically between about 10 and 20 microns and meltblown nonwoven webs are formed from consolidated structures or sheets of fibers generally smaller than 10 microns in average diameter. The nonwoven web may consist of a multilayer laminate characterized by a combination of spunbond and meltblown layers. Common thermoplastic polymers used to form nonwoven webs include, but are not limited to, polyolefins such as polyethylene, polypropylene, polybutylene, polyamides such as nylon 6, nylon 6/6, nylon 10, and nylon 12, polyesters such as polyethylene terephthalate and polybutylene terephthalate, polycarbonates, polystyrenes, thermoplastic elastomers, fluoropolymers, vinyl polymers, and blends and copolymers thereof.

In yet another specific embodiment of the invention, the barrier layer 20 may further include a cellulosic nonwoven material formed from an entangled collection or mat of cellulosic fibers, such as wood pulp fibers, cotton (cellulose) fibers, rayon (regenerated cellulose) fibers, acetate (cellulose acetate) fibers, and triacetate (cellulose triacetate) fibers. The cellulosic nonwoven material may also be provided as a lamina in the layered structure of the article 10 distinct from barrier layer 20 or, alternatively, as a lamina or distributed component of the sheet 12 or of the bonding agent 14. The nonwoven material may also be characterized by a composite blend of cellulosic fibers and thermoplastic or synthetic fibers or filaments formed by, for example, by hydroentanglement. The nonwoven material may also be constructed from one or more webs of thermoplastic fibers and filaments and one or more webs of cellulosic fibers laminated together.

In yet another specific embodiment of the invention, the barrier layer 20 may further incorporate a metallized film formed from a metallized coating or foil and, optionally, a single ply of a polymer film to which the metallized coating or foil is laminated. The metallized film may also be provided as a lamina in the layered structure of the article 10 distinct from barrier layer 20 or, alternatively, as a lamina disposed in the sheet 12 or of the bonding agent 14. Suitable metallized films include, but are not limited to, metallized polyethyleneterephthalate polymers and copolymers, metallized polypropylene polymers and copolymers, metallized polyamide polymers and copolymers, metal foil, and combinations of these materials in the form of, for example, layers stacked in a laminate. Metallized films may be formed by a process such as vapor phase metallization or chemical vapor deposition of a metal, such as aluminum or other metals such as gold, silver, and copper, onto at least one planar surface of a polymer film. The metallized film may be introduced into the fabrication process forming the article 10 as a lamination.

In yet another specific embodiment of the invention, the barrier layer 20 may further incorporate a flexible cellulosic material. The flexible cellulosic material may also provided as a lamina in the layered structure of the article 10 distinct from barrier layer 20 or, alternatively, as a portion of the sheet 12 or of the bonding agent 14. The cellulosic material is any material having cellulose or a cellulose derivative as a constituent. Suitable cellulosic materials include, but are not limited to, paper, paper coated with a butyrate lacquer, cotton, typical wood pulps, nonwoody cellulosic fibers, cellulose acetate, cellulose triacetate, rayon, thermomechanical wood pulp, chemical wood pulp, debonded chemical wood pulp, milkweed, bacterial cellulose, and combinations thereof. The fibers may also be crosslinked, sulfonated, mercerized, heat treated, mixed with thermoplastic stabilizer fibers, or treated with wet strength agents. Mixtures of various fibers can be used, including coform, and other mixtures of co-deposited thermoplastic fibers and wood fibers. Cellulose acetate is made from wood pulp processed using acetic anhydride to form acetate flake. Cellulose acetate is manufactured in a wide variety of thicknesses, ranging from 0.001 inch to 0.005 inch (0.025 mm to 0.13 mm), and is normally transparent. Cellulose acetate butyrate is an optically-transparent lacquer that may be applied to paper or consolidated wood pulp.

The cellulosic material may be coated with any conventional pigmented layer or coating containing calcium carbonate, titanium dioxide, silica, satin white, barytes, mica, zinc oxide, plastic pigments, or a kaolin clay pigment, which is composed primarily of kaolinite (a hydrated aluminum silicate $(Al_2Si_2O_5(OH)_4)$). The pigmented coating is applied to sheet 12 as an aqueous suspension or dispersion of pigment material in a binder, including but not limited to starch, proteins, styrene butadiene dispersions or lattices, polyvinyl acetate and lattices, and acrylic lattices. The presence of the pigmented coating may contribute an additional barrier effect to the cellulosic material, reinforce the barrier effect of the cellulosic material, or endow the cellulosic material with the barrier effect effective to prohibit or retard the transfer of the extraneous agent 21 to layer 12. Generally, such pigmented coatings have a thickness in the range of about 20 μm to about 80 μm. The pigmented coating may be modified by a surface treatment containing, for example, a soluble metal salt to increase its barrier properties.

The invention contemplates that the article 10 may, in addition to barrier layer 20, incorporate a scavenger material 32 (FIG. 2) and/or a neutralizing agent 46 (FIG. 3), as described herein that cooperates with barrier layer 20 for reducing or preventing transfer of the extraneous agent 21 from the surface 16 to the sheet 12. The scavenger material 32 and/or neutralizing agent 46 may be provided as a distinct layer or may be included in one or more lamina of the layered article 10, including the sheet 12, the bonding agent 14, and the barrier layer 20. The scavenger material 32 disposed in article 10 may be a material selected from zeolites, mesoporous zeolites, high-surface-area carbon blacks, DGB carbon blacks, polycationic molecules, polyvinylpyrrolidone polymers and copolymers, cyclodextrin compounds, activated carbon, cationic carbons, cationic inert materials, anionic materials, magnesium oxide, activated alumina, mixed metal oxides, nanoparticles of metal oxides, coconut-based carbons, wood-based carbons, carbon nanotubes, carbon nanofibers, ion-exchange resins, dye transfer inhibitors, and combinations, blends or mixtures of these materials.

Figure 1A:
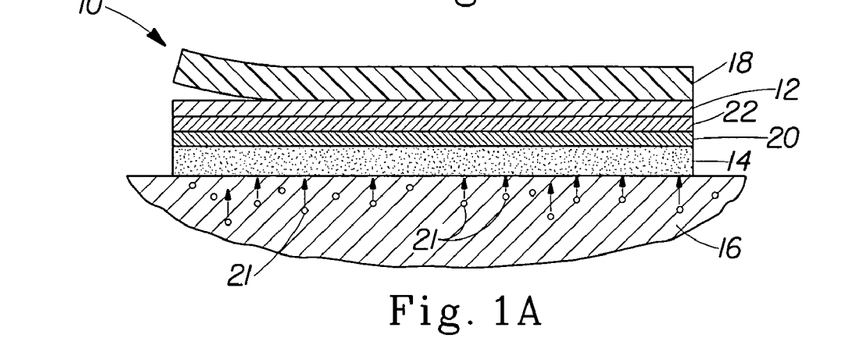
FIG. 1A is a diagrammatic view similar to FIG. 1 in accordance with an embodiment of the invention.

With reference to FIG. 1A, the article 10 may further comprise one or more tie layers 22 disposed between the sheet 12 and the barrier layer 20, as depicted in FIG. 1A, and/or one or more tie layers (not shown but similar to tie layer(s) 22) disposed between the bonding agent 14 and the barrier layer 20. The invention contemplates that one or more of the tie layers 22 may serve as, or contain, the barrier layer 20. Typical materials forming at least a portion of each tie layer 22 include functionalized polyolefins ethylene acrylate, ethylene vinyl acetate, functionalized acrylics, polyvinyl chloride, polyolefins, polyethoxylate, and combinations, blends and copolymers thereof. Each tie layer 22 may also contain scavenger material 32 (FIG. 2) and/or neutralizing agent 46 (FIG. 3), as described herein, that cooperates with barrier layer 20 for reducing or preventing the transfer of the extraneous agent 21 from the surface 16 to the sheet 12.

Figure 2:
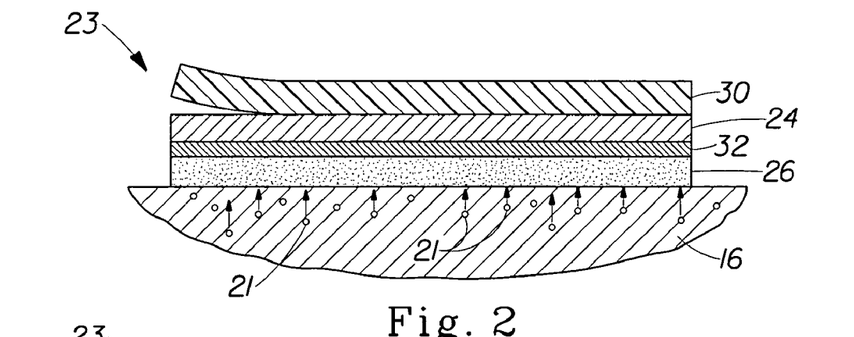
FIG. 2 is a diagrammatic view of an article for applying color to a surface in accordance with an alternative embodiment of the invention.

With reference to FIG. 2 in which like reference numerals refer to like features in FIG. 1 and in accordance with another embodiment of the invention, an article 23 for applying color on surface 16 comprises a sheet 24 of visually-perceivable color effects, a bonding agent 26, and a releasable liner 30. Sheet 24 is similar to sheet 12 and may include a topcoat 25 as a lamina, bonding agent 26 is similar to bonding agent 14, and releasable liner 30 is identical to releasable liner 18.

In accordance with the principles of the invention, the article 23 further includes a scavenger material, diagrammatically represented by reference numeral 32, capable of either absorbing or capturing a extraneous agent 21 transferred from the surface 16 to which the article 23 is applied such that the extraneous agent 21 cannot affect a property, such as the coloration, of the sheet 24 over the lifetime of the article 23 on the surface 16. The scavenger material 32 scavenges the extraneous agent 21 by either capture, absorption, adsorption or trapping in a manner effective to either block or prevent transfer, such as by diffusion, migration or blooming, of the extraneous agent 21 into the sheet 24, which prevents degradation of a property of the article 23. For example, the action of the scavenger material 32 may eliminate the occurrence of discoloration in the sheet 24. Alternatively, the scavenger material 32 may merely slow or retard the transfer of the extraneous agent 21 by capture or absorption so that a property of sheet 24, such as color, is not perceptibly affected over at least the lifetime of the article 23 while residing on the surface 16. The scavenger material 32 is present with a concentration and/or at a location effective to mitigate, reduce or eliminate the impact of an extraneous agent 21 originating from the surface 16 to the sheet 24. The scavenger material 32 may be applied by various techniques including, but not limited to, as printing, extrusion, co-extrusion, coating, spraying, and combinations of these techniques.

In various specific embodiments of the invention, the scavenger material 32 is a material selected from polycationic molecules, polyvinylpyrrolidone polymers and copolymers, cyclodextrin compounds, activated carbon, cationic carbons, cationic inert materials, anionic materials, magnesium oxide, activated alumina, mixed metal oxides, nanoparticles of metal oxides, coconut-based carbons, wood-based carbons, carbon nanotubes, carbon nanofibers, ion-exchange resins, dye transfer inhibitors, and combinations, blends or mixtures of these materials. The scavenger material 32 may optionally incorporate at least one additional scavenger component selected from zeolites, mesoporous zeolites, high-surface-area carbon blacks, and/or DGB carbon blacks.

The scavenger material 32 is illustrated in FIG. 2 as being confined or incorporated as an identifiable layer, stratum or lamina in the layered structure of article 23. In an alternative embodiment of the invention, a scavenger material 32a, characterized by properties identical to scavenger material 32, may be incorporated as a component of the bonding agent 26. In yet another alternative embodiment, a scavenger material 32b, also characterized by properties identical to a scavenger material 32a, may be incorporated as a component of the sheet 24. The scavenger material 32a and 32b may be segregated as a layer, stratum or lamina positioned within the thickness of the bonding agent 26 or sheet 24, respectively, or may be distributed uniformly throughout the thickness of the corresponding one of the bonding agent 26 or sheet 24. The scavenger materials 32, 32a and 32b may be employed individually or incorporated into article 23 in any permutation or combination. Each of the scavenger materials 32, 32a and 32b may combine two or more of the candidate materials described herein. The properties of scavenger material 32 described herein are understood to be representative of scavenger material 32a and 32b.

In one embodiment of the invention and as mentioned above, the scavenger material 32 in accordance may be a dye transfer inhibitor. The dye transfer inhibitor may be present in either the sheet 24 or the bonding agent 26 in an amount effect to prevent dye transfer to the sheet or retard dye transfer to the sheet 24 over the functional lifetime of the article 23. Generally, the dye transfer inhibitor is present in an amount ranging from about 0.01 percent by weight to about 10 percent by weight of the composition. Suitable dye transfer inhibitors include, but are not limited to, dye polyvinyl pyrolidone polymers, polyamine N-oxide polymers, copolymers of N-vinylpyrrolidone and N-vinylimidazole, manganese phthalocyanine, peroxidases, and combinations thereof. Exemplary dye transfer inhibitors are described in commonly-assigned U.S. Pat. No. 5,633,225, the disclosure of which is hereby incorporated by reference herein in its entirety.

In another embodiment of the invention and as mentioned above, the scavenger material 32 may be activated carbon that, due to its high porosity levels, is capable of absorbing extraneous agents 21 transferred from the surface 16 to which the article 23 is applied. Activated carbon may be provided in either particle forms, fiber forms, nanotube forms, ink forms containing a binder, solvent, ink and activated carbon particles, and mixtures of these various forms. In the particle, fiber, and nanotube forms, the average particle size may be in the range of about 3 $\mu$m to about 70 $\mu$m and, preferably, is in the range of about 12.5 $\mu$m or less. The ink form may be applied as a distinct layer by any conventional printing technique or, alternatively, may be dispersed in the bonding agent 26 and applied by a technique such as printing, extrusion, co-extrusion, coating, spraying, and combinations of these techniques.

Suitable particle forms of activated carbon are commercially available from various sources including Calgon Carbon Corp. (Pittsburgh, Pa.), the Specialty Chemicals Division of MeadWestvaco Corp. (Covington, Va.), and Carbochem Inc. (Ardmore, Pa.). Specific particle forms of activated carbon that may be useful in practicing the invention include Calgon Carbon ADP coconut-based activated carbon, RGC wood-based activated carbon (WAC), RGC WAC +PVAm, Nuchar SN-30 (WAC), and Nuchar SA-1500 (WAC) from MeadWestvaco, and Carbochem CA-10 (WAC).

In another embodiment of the invention and as mentioned above, the scavenger material 32 may comprise a coating applied to sheet 27 containing a cyclodextrin compound, which may be substituted or derivatized. Generally, cyclodextrin is a cyclic oligosaccharide consisting of at least five, preferably at least six, glucopyranose units joined by a-1, 4 linkages. One such cyclodextrin-based barrier layer 20 is an extruded film coating composed of about 0.1 percent by weight to about 60 percent by weight of a cyclodextrin compound dissolved or dispersed in a thermoplastic diluent constituting the balance of the composition. The extruded film coating, which may have a thickness ranging from about 0.3 mil (0.0075 mm) to about 1.5 mil (0.038 mm), is included as a lamination in the structure of the article 23 at a location between the sheet 24 and the bonding agent 26. The cyclodextrin compound may also be applied by solution coating the sheet 24 with an aqueous or other solvent born solution or dispersion of the cyclodextrin compound with an inert carrier or film forming agents (e.g., binder) such as starch, modified starch, cellulose, modified cellulose, and film-forming polymers. After the water or solvent is removed, the residual film should contain about 0.1 grams of cyclodextrin per square meter to about 0.6 grams of cyclodextrin per square meter. Scavenger materials 32 incorporating such cyclodextrin compounds are described in International Application Number PCT/US99/08017.

In another embodiment of the invention and as mentioned above, the scavenger material 32 may comprise an ion-exchange resin. Ion-exchange resins are polymeric resins that contain electrically charged fragments or fixed ions permanently attached to a polymer backbone.

Figure 2A:
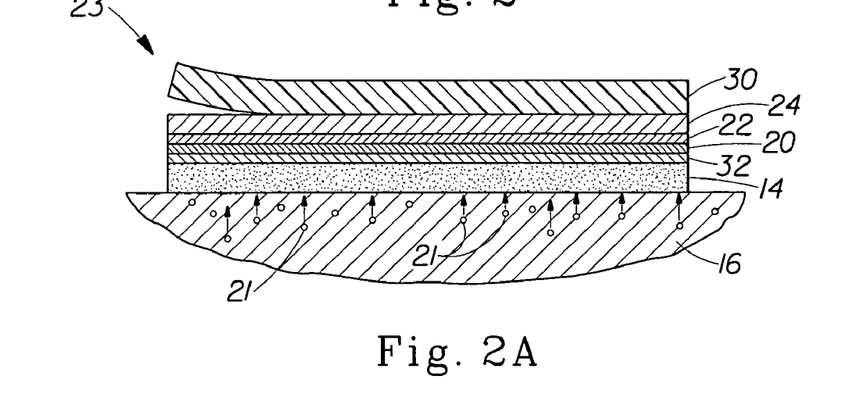
FIG. 2A is a diagrammatic view similar to FIG. 2 in accordance with an embodiment of the invention.

With reference to FIG. 2A in which like reference numerals refer to like features in FIGS. 1A and 2, the article 23 may further comprise one or more tie layers 22 and/or a barrier layer 20 disposed between the sheet 24 and the bonding agent 26. The one or more tie layers 22, the scavenger material 32 and the barrier layer 20, if identifiable as discrete lamina, may be arranged in any suitable order in the thickness of article 23. The tie layer(s) may contain the scavenger material 32 or a portion of the scavenger material 32 that cooperates with another portion of the scavenger material 32 in another lamina of the layer article 23 for reducing or preventing the transfer of the extraneous agent 21 from the surface 16 to the sheet 12. Barrier layer 20 may be any of the candidate barrier layers 20 described herein. Alternatively, barrier layer 20 of article 23 may be formed from a polymer, a cellulosic material, a non-woven material, or a metallized film, as described herein.

Figure 3:
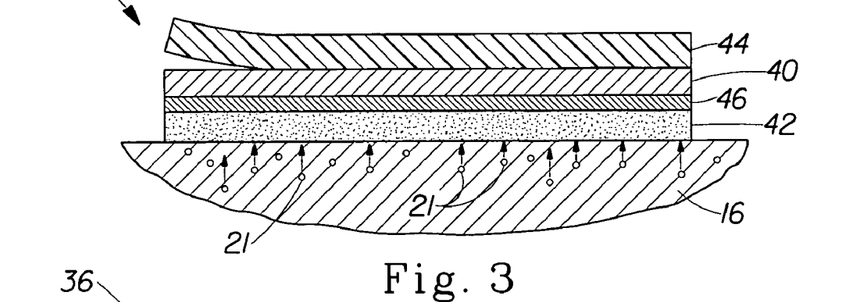
FIG. 3 is a diagrammatic view of an article for applying color to a surface in accordance with another alternative embodiment of the invention.

With reference to FIG. 3 and in accordance with another embodiment of the invention, an article 36 for applying color on surface 16 comprises a sheet 38 of visually-perceivable color effects, a bonding agent 40, such as adhesive, on one surface 42 of the sheet 38, and a releasable liner 44. Sheet 38 is similar to sheets 12 and 24 and may include a topcoat 45 as a distinct lamina, bonding agent 40 is similar to bonding agents 14 and 26, and releasable liner 44 is identical to releasable liners 18 and 30.

The article 36 further includes a neutralizing agent, diagrammatically represented by reference numeral 46, capable of disrupting the chemical bonds of the extraneous agent 21 transferred from the surface 16. The neutralizing agent 46 disrupts the chemical bonding of the extraneous agent 21 in a manner effective to either block or prevent diffusion into the sheet 38 so as to prevent degradation of a property (e.g., discoloration of a color) of the article 36, such as preventing or lessening the occurrence of discoloration. Alternatively, the neutralizing agent 46 may slow or retard transfer of the extraneous agent 21 so that the property of sheet 38 is not perceptibly affected over at least the functional lifetime of the article 36. The neutralizing agent 46 is present with a concentration and/or at a location effective to reduce or eliminate the transfer extraneous agent 21 from the surface 16 to the sheet 36.

The neutralizing agent 46 is depicted in FIG. 3 as being confined or incorporated as an identifiable layer, stratum or lamina in the layered structure of article 36. In an alternative embodiment of the invention, a neutralizing agent 46a, characterized by properties identical to neutralizing agent 46, may be incorporated as a component of the bonding agent 40. In yet another alternative embodiment, a neutralizing agent 46b, also characterized by properties identical to a neutralizing agent 46a, may be incorporated as a component of the sheet 38. The neutralizing agent 46a and 46b may be segregated as a layer, stratum or lamina positioned within the thickness of the bonding agent 40 or sheet 38, respectively, or may be distributed uniformly throughout the thickness of the corresponding one of the bonding agent 40 or sheet 38. The neutralizing agents 46, 46a and 46b may be employed individually or incorporated into article 36 in any permutation or combination. Each of the neutralizing agents 46, 46a and 46b may combine two or more of the candidate materials described herein. The properties of neutralizing agent 46 described herein are understood to be representative of neutralizing agent 46a and 46b.

In one specific embodiment of the invention, the neutralizing agent 46 is a bleaching compound that neutralizes the color associated with the extraneous agent 21 originating from the surface 16 to which the article 36 is applied. The bleaching compound may any of the oxidizing agents known for laundry, hard surface cleaning, automatic dishwashing or denture cleaning purposes. Bleaching compounds suitable for use in the invention include, but are not limited to, halogen bleaches such as, hypohalites such as hypochlorite bleaches, oxygen bleaches, peroxide bleaches, sodium borohydride, peracids, and mixtures thereof. The bleaching compound operates to disrupt the chemical bonds of the extraneous agent 21 so that it no longer manifests or exhibits a perceptible color that capable of discoloring the sheet 38.

In another specific embodiment, the neutralizing agent 46 is an optical brightener or a fluorescent whitening agent incorporated into the sheet 38 or into the topcoat 45, if present. As know to persons of ordinary skill in the art, optical brighteners are colorless fluorescent dyes commonly used to make white textiles appear visibly brighter. Optical brighteners operate functionally by emitting visible light in a wavelength range of about 400 nm to about 500 nm when exposed to ultraviolet light in a wavelength range of about 300 nm to about 430 nm, such as ultraviolet light contained in artificial or natural light illuminating article 36 when applied to the surface 16. Optical brighteners interfere with dyes or pigments, such as extraneous agent 21, by competing for the activation sites in the sheet 38. The optical brightener operates to visually mask the color manifested by the extraneous agent 21. Optical brighteners are structured molecularly as chromophores constructed from building blocks selected from among vinylene, imino, 2-pyrazoling-1,3-diyl, 1,4-phenylene, 2,5-furanediyl, 2,5-thiophenediyl, phenyl, fur-2-yl, pyrazol-4-yl, pyrazol-1-yl, 1,2,3-triazol-2-yl, 1,2,4-triazol-1-yl, 1,3,5-triazin-2-yl, 1,2,4-oxadiazol-5-yl, 1,4-naphthylene, benzofuran-2-yl, benzoxazol-2-yl, benzimidazol-2-yl4,7-coumarindiyl, naphtha[1,2-d]triazol-2-yl, naphthalimido, pyren-1-yl, and combinations thereof that are linked together. Suitable optical brighteners are listed in Ullmann's Encyclopedia of Industrial Chemistry, Vol. 18A, pp. 153-176, the disclosure of which is hereby incorporated by reference herein in its entirety.

In yet another specific embodiment of the invention, the neutralizing agent 46 is a pH modifier added to either the sheet 38 or the bonding agent 40 that operates for discoloring the extraneous agent 21 transferred from the surface 16 to which the article 36 is applied. The pH modifier disrupts the chemical bonds of the extraneous agent 21 so that the extraneous agent 21 cannot exhibit or otherwise manifest a visually-perceptible color or, at the least, the ability of the extraneous agent 21 to manifest an intrinsic visually-perceptible color is significantly lessened. The pH modifier may be any acidic or alkaline substance that is chemically compatible with either the material(s) constituting the sheet 38, if added to the sheet 38, and/or that is chemically compatible with the material(s) characterizing the bonding agent 40, if added to the bonding agent 40.

Figure 3A:
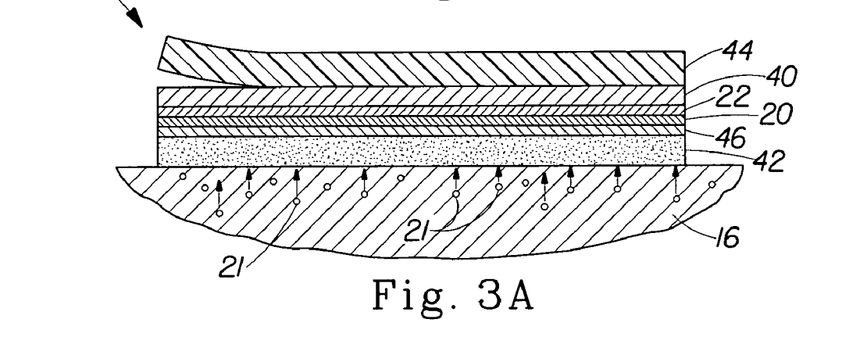
FIG. 3A is a diagrammatic view similar to FIG. 3 in accordance with an embodiment of the invention.

With reference to FIG. 3A in which like reference numerals refer to like features in FIGS. 1A and 3, the article 36 may further comprise one or more tie layers 22 and/or a barrier layer 20 disposed between the sheet 38 and the bonding agent 40. The barrier layer 20 and/or tie layer(s) 22 may also optionally contain scavenger material 32 (FIG. 2), as described herein, that acts in combination with the neutralizing agent 46. The optional scavenger material 32 may also be provided as a distinct lamina in the layered structure of the article 36 or, alternatively, as a portion of the sheet 38 or of the bonding agent 40. Alternatively, scavenger material 32 may be included as a distinct lamina in the layered structure of article 23 and/or may be included as a component or lamina in the sheet 24 and/or the bonding agent 26 of article 23. The barrier layer 20 of article 36 may be any of the barrier layers 20 described herein or, alternatively, may be formed from a material selected from a polymer, a cellulosic material, a non-woven material, or a metallized film. The scavenger material 32 in article 36 may be a material selected from zeolites, mesoporous zeolites, high-surface-area carbon blacks, DGB carbon blacks, polycationic molecules, polyvinylpyrrolidone polymers and copolymers, cyclodextrin compounds, activated carbon, cationic carbons, cationic inert materials, anionic materials, magnesium oxide, activated alumina, mixed metal oxides, nanoparticles of metal oxides, coconut-based carbons, wood-based carbons, carbon nanotubes, carbon nanofibers, ion-exchange resins, dye transfer inhibitors, and combinations, blends or mixtures of these materials.

The invention contemplates that the article 36 may include barrier layer 20 (FIG. 1), scavenger material 32 (FIG. 2) and neutralizing agent 46 (FIG. 3 in any possible permutation or combination. Accordingly, the barrier layer 20, scavenger material 32 and/or neutralizing agent 46 may make individual contributions that collectively operate to reduce or prevent the transfer of extraneous agent 21 from the surface 16 to the sheet 38. In certain embodiments of the invention, the individual contributions may not be sufficient in isolation to achieve the desired prevention or reduction in the transfer of extraneous agent 21 but, collectively, the individual contributions yield the desired effect. The invention also contemplates that more than one type of barrier layer 20, more than one type of scavenger material 32 and/or more than one type of neutralizing agent 46 may be provided, in combination, for supplying a targeted desired prevention or reduction in the transfer of extraneous agent 21.

The barrier layer 20 (FIG. 1), scavenger material 32 (FIG. 2) or neutralizing agent 46 (FIG. 3) may be distributed homogeneously or uniformly over the plane of the corresponding article 10, 23 or 36. Alternatively, the barrier layer 20, scavenger material 32 or neutralizing agent 46 may be distributed in a heterogeneous pattern such that the amount or density of the barrier layer 20, scavenger material 32 or neutralizing agent 46 has a spatial dependence over the article's horizontal plane. For example, the barrier layer 20, scavenger material 32 or neutralizing agent 46 may be absent from certain article areas, may have a concentration or thickness gradient across the article's horizontal plane, may be present in different concentrations or thicknesses in different locations in the article's horizontal plane (i.e., a greater concentration or thickness near the article's peripheral edges), etc. The concentration or thickness in the pattern may be modulated either systematically or randomly, and all areas in the article's horizontal plane may have a non-zero concentration or thickness of the barrier layer 20, scavenger material 32 or neutralizing agent 46.

Color change/stability is measured according to the following procedure. A square sample measuring 7.62 cm per side is provided. The sample is adhesively mounted onto a rigid backing board, being careful to eliminate air bubble and wrinkles. Any overling carrier layer or releasable liner is removed from the sample, exposing the color layer.

The rigid backing board is prepared as follows. A board made of drywall is provided. The board is painted with a commercially available primer, as is available from Behr Corporation as Behr Premium Plus PVA Drywall Primer & Sealer No. 73 white latex. Upon drying the board is painted with a paint having 49.3 grams/liter of pigment. Suitable paint is commercially available from Behr as Behr, Premium Plus Interior Semi-Gloss Enamel Pastel Base no. 3500. Painting may be accomplished with a synthetic lambskin roller having a nap of about 6.35 mm. The board is disposed on a horizontal surface and primed/painted until the surface has a uniform and even coating of primer/paint. A period of 24 hrs occurs between coats at 50 percent RH and 20 degrees C. A baseline L*A*B colorimeter measurement of the sample is made according to ASTM Test Methods E1164 to measure the ample color and E308 to convert the color measurement to L.a.b. scale) A Minolta CM508d calorimeter with a pulsed Xenon arc lamp has been found suitable with the following settings: 2° C.; SCE; 8 mm sample area. After the baseline measurement is taken, the sample is placed in a 60 degree C. test oven. The sample is removed hourly and tested for L*A*B* again as set forth above. The hourly testing occurs until the recorded change in the B* (referred to as ΔB*) is less than 10% between consecutive measurements.

An article 10 according to the present invention may have an opacity of at least 99, preferably at least 99.3 and more preferably at least 99.5 measured according to ASTM standard D2805. Furthermore such article may have a thickness of less than 0.084 mm, preferably less than 0.076 mm, more preferably less than 0.064 mm, more preferably less than 0.05 mm and more preferably less than 0.04 mm measured under a confining load of 8.74 grams with a presser foot diameter of 5 mm. Articles 10 thus made will have an opacity to thickness ratio of at least 40, preferably at least 50 and more preferably at least 55 per mm.

EXAMPLE 1

Figure 4:
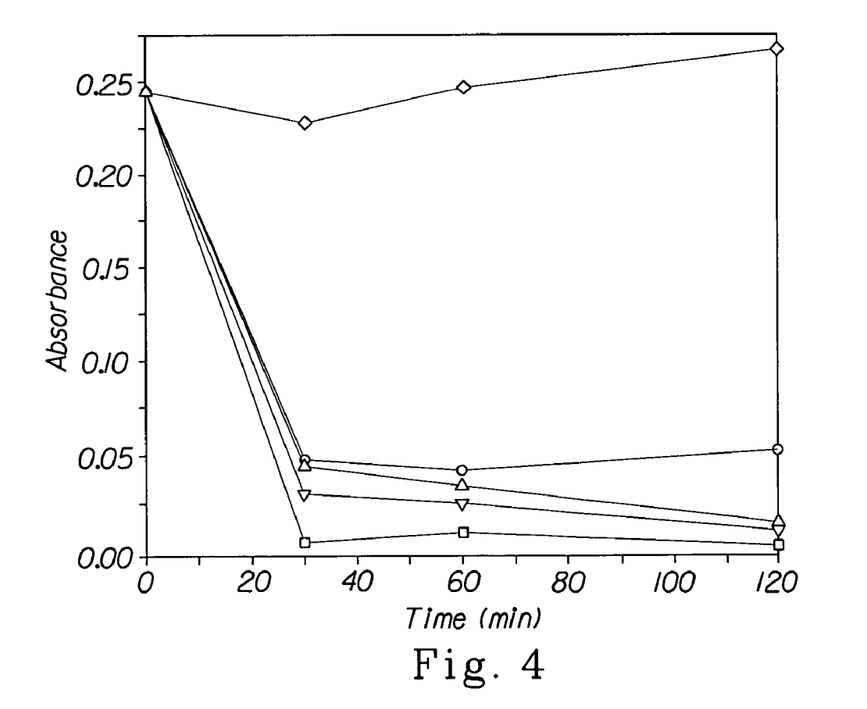
FIG. 4 is a graphical representation illustrating the absorbance of solutions containing a mono-azo pigment with and without the addition of various types of activated carbon.

Solutions of 10 grams of Hansa Yellow (mono-azo) pigment and 2-propanol (IPA) was prepared. A spectrophotometer was used to find peaks in an absorbance curve of a 10 ppm solution. A principle absorption peak was observed at a wavelength of about 404 nm. All subsequent absorbance readings were made at 404 nm. The absorbance at 404 nm of 2, 4, 6, 8, and 10 ppm solutions were determined for a calibration curve. Various types of activated carbon (approximately 45 to 63 microns in diameter) were added to the 10 ppm solution, which was stirred continuously on a stir plate. A solution lacking carbon was used as a control. Aliquots were removed as samples after 30 min, 60 min, and 120 min. The samples were centrifuged to remove carbon and the absorbance was sampled using the spectrophotometer. The results are presented in FIG. 4.

The uppermost curve represents absorption of the control and the lower four curves represent absorption after addition of various types of activated carbon. It is apparent from FIG. 4 that the absorbance characterizing the 404 nm peak of Hansa Yellow pigment is significantly reduced due to the presence of the activated carbon in the solution. Specifically, the absorbance is reduced by at least a factor of five and as much as over an order of magnitude by the action of activate carbon. In order from least reduction in absorbance to the greatest reduction in absorbance, the specific activated carbons in the solution were MeadWestvaco SA-1500 wood-based activated carbon, wood-based activated carbon, coconut-based activated carbon, and MeadWestvaco RGC wood-based activated carbon, respectively.

Activated carbon, because of its high porosity levels, is effective for absorbing the Hansa Yellow (mono-azo) pigment. Although not shown in FIG. 4, increasing the amount of carbon added to the solution was observed to increase the amount of yellow pigment removed from the solution. It follows that an extraneous agent, if positioned between the sheet of color and the surface to which the article is applied, would be effective in halting the migration of the extraneous agent by operating as a scavenger material. As a result, the sheet of color would not be discolored as the activated carbon would capture migrating extraneous agent before the extraneous agent enters the sheet of color.

Thirty-six additional samples were made and tested according to the procedures set forth above. The results are shown in Table 1 below.

TABLE 1

| Material | Material Code | Coating Concentration or Thickness | Test Conditions | Days to Visual Change Target = No Change | ΔB @384 hrs Target: ΔB < 0.4 @ 384 hrs | ΔB* (Reported Dec. 1, 2003) Target: ΔB < 0.4 @ 384 hrs | Comments |
|---|---|---|---|---|---|---|---|
| *Carbon/absorbents* | | | | | | | |
| Carbon Ink | Nuchar PMA Lot #5 (60% carbon) | unknown | 60 C. | 1-13 | | | Color change at thumbprint and other spots. |
| Carbon Ink | Nuchar PMA Lot #5 (60% carbon) | 30.0 mg/in² dry carbon(#1) | 60 C. | no change @ 135 | | | carbon coating appears discontinuous/cracked |
| Carbon Ink | Nuchar PMA Lot #5 (60% carbon) | 16.7 mg/in² dry carbon(#2) | 60 C. | no change @ 135 | | | carbon coating appears discontinuous/cracked |
| Carbon Ink | Nuchar PMA Lot #5 (60% carbon) | 15.9 mg/in² dry carbon(#3) | 60 C. | no change @ 135 | | | carbon coating appears discontinuous/cracked |
| Carbon Ink | Nuchar PMA Lot #5 (60% carbon) | 15.4 mg/in² dry carbon(#4) | 60 C. | 3-4 | | | Color change in thin, cracked areas. |
| Carbon Powder | 5 um RGC | unknown | 60 C. | 2-6 | | | |
| Carbon Powder | 5 um RGC | unknown | 60 C. | 3-7 | | | |
| Talc | Aldrich <10 um | unknown | 60 C. | 1 | | | |
| PVNO | 2:1 Flexbond AF75:Chromabond | 20 um of blend | 60 C. | | 10.7 @ 339 hrs | | Laundry DTI polymer blended with acrylic adhesive |
| *Coatings* | | | | | | | |
| Polystyrene | XU30900.51 | 2.8 mils wet | 60 C. | 1-13 | | | Color change in spots. Crackled texture only where carrier was pulled away but not where rest of carrier was left on. |
| PVDC (film) | Polidene 33-065 (Scott Bader) | 10 um/15 um AF75 | 60 C. | | 6.5 @ 363 hrs | | PVDC copolymer, Tg = 19 C., latex |
| PVDC (blend) | 3:1 Flexbond AF75:Polidene | 20 um of blend | 60 C. | | 10.0 @ 339 hrs | | Latex blended to produce tortuous path through adhesive |
| PVDC (film) | F278 (Dow) | 10 um/15 um AF75 | 60 C. | | 3.8 @ 365 hrs | | PVDC copolymer, Tg > ambient, solvent cast |
| PVDC (film) | F310 (Dow) | 10 um/15 um AF75 | 60 C. | | 0.57 @ 365 hrs | | PVDC: AN copolymer, Tg > ambient, solvent cast |
| *Films* | | | | | | | |
| Purple Print Pak Decorate & 0.5 mil XC003 S3506 | Purple Decorate: Made Sep. 6, 2001 #5.A 1%; S3506 made Apr. 5, 2003 | 0.5 mil S3506 adhesive added to 0.5 mil Met PET (plus unknown thickness adhesive, white coat, color, and varnish) | 60 C. | no change @ 240 | | | |
| OPP | CPPD film rack | 0.8 mil | 60 C. | 2-5 | | | |
| HDPE | CPPD film rack | 0.5 mil | 60 C. | 1 | | | |
| Mylar® | CPPD film rack | 0.5 mil | 60 C. | no change @ 130 | 0.39 @ 340 hrs, 0.28 @ 436 hrs | | |
| Mylar | Dupont Teijin Films (type 854) | 48 gauge | | | | ΔB* = 0.76 @ 3516 hours | |

TABLE 1-continued

| Material | Material Code | Coating Concentration or Thickness | Test Conditions | Days to Visual Change Target = No Change | ΔB @384 hrs Target: ΔB < 0.4 @ 384 hrs | ΔB* (Reported Dec. 1, 2003) Target: ΔB < 0.4 @ 384 hrs | Comments |
|---|---|---|---|---|---|---|---|
| Mylar | Dupont Teijin Films (type 854) | 48 gauge | 49 C | no change | 0.22 @ 360 hrs, 0.19 @ 408 hrs | ΔB* = 0.38 @ 3264 hours | |
| Mylar | Dupont Teijin Films (type 854) | 48 gauge | 38 C | no change | 0.11 @ 360 hrs, 0.19 @ 408 hrs | ΔB* = 0.32 @ 3264 hours | |
| Paper | | | | | | | |
| Thermal Paper | From SJ-301 | 2 mil | 60 C. | after 24 hrs brownish | | ended at 886 Hrs; ΔB* = 4.57 | |
| Bronco Paper | From Desk Cube | 4 mil | 60 C. | | 0.26 @ 334 hrs, 0.43 @ 502 hrs | ΔB* = 0.7 @ 1582 hrs | |
| Brown Crepe Paper | From Bruce | 5 mil | 60 C. | | 0.26 @ 334 hrs, 0.42 @ 502 hrs | ΔB* = 0.7 @ 1582 hrs | |
| Copier Paper | From Printer | 4 mil | 60 C. | | 0.31 @ 334 hrs, 0.53 @ 502 hrs | ΔB* = 0.8 @ 1582 hrs | |
| Filter Paper | Whatman Qualitative No. 1 | 7 mil | 60 C. | | 0.56 @ 334 hrs, 0.6 @ 502 hrs | ΔB* = 1.1 @ 1582 hrs | |
| Alternative adhesives | | | | | | | |
| Acrylic latex | Flexbond AF 75 | 15 um | 60 C. | | 11 @ 384 hrs | | |
| Acrylic latex | Flexbond AF 75 | 15 um | 60 C. | | 10.9 @ 384 hrs | | |
| Acrylic latex | Flexbond AF 75 | 50 um | 60 C. | | 9.3 @ 54 hrs | | |
| Acrylic latex | Flexbond AF 75 | 100 um | 60 C. | | 9.8 @ 54 hrs | | |
| Acrylic latex | Flexbond AF 75 | 200 um | 60 C. | | 9.5 @ 54 hrs | | |
| PIB | MA 24A | 45 um | 60 C. | | 10.2 @ 389 hrs | | |
| Acrylic | HY3 | 45 um | 60 C. | | 10.1 @ 389 hrs | | |
| Acrylic | K294 | 15 um | 60 C. | | 10.0 @ 172 hrs | | |
| Acrylic | PS 8120 | 15 um | 60 C. | | 9.0 @ 172 hrs | | |
| Acrylic | PS 8211 | 15 um | 60 C. | | 7.8 @ 172 hrs | | |

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article for conveying visually-perceivable color effects to a substrate surface containing a dye or pigment, said article comprising:
 a sheet of visually-perceivable color effects, said sheet having two surfaces;
 a bonding agent disposed on one surface of said sheet and capable of bonding said sheet to the substrate surface, said bonding agent having an outer surface for contacting said substrate surface;
 a releasable liner removably attached to the surface of said sheet opposite said bonding agent; and
 a barrier layer effective for reducing transfer of the dye or pigment from the substrate surface to said sheet, wherein said barrier layer is positioned between the outer surface of said bonding agent and the surface of said sheet to which said releasable liner is attached, wherein said barrier layer consists essentially of nanocomposites, and wherein said sheet and bonding agent have a combined thickness of less than 3 mils.

2. An article for conveying visually-perceivable color effects to a substrate surface containing a dye or pigment, said article comprising:
 a sheet of visually-perceivable color effects, said sheet having two surfaces;
 a bonding agent disposed on one surface of said sheet and capable of bonding said sheet to the substrate surface, said bonding agent having a first surface facing said sheet, and a second surface facing away from said sheet;
 a releasable liner removably attached to the surface of said sheet opposite said bonding agent; and
 a barrier layer between said sheet and said second surface of said bonding agent, said barrier layer comprising a polymer film effective for reducing transfer of the dye or pigment from the surface to said sheet,
wherein said sheet and bonding agent have a combined thickness of less than 3 mils, and said sheet is extensible to allow bending and rolling without cracking, breaking, or other damage to the sheet and exhibits an elongation of less than about 50%, and
wherein said polymer film comprises a material selected from the group consisting of: polyvinylidene chloride polymers and copolymers, polyvinyl alcohol polymers and copolymers, ethylene vinyl alcohol polymers and copolymers, polycholorotrifluoroethylene polymers and copolymers, acrylonitrile methacrylate polymers and copolymers, polyacrylonitrile polymers and copolymers, aromatic polyamide polymers and copolymers, amorphous polyamide polymers and copolymers, polyvinyl chloride polymers and copolymers, polyvinylidene fluoride polymers, liquid crystalline polymers and copolymers, polystyrene, polyethylene, acrylic, styrene-acrylic copolymers, alkyd, polyurethane, polypropylene polymers and copolymers, oriented polypropylene polymers and copolymers, cellulosic polymers, copolymers and coatings, aliphatic polyesters, polyhydroxy alkonals, polycaprolactones, poly lactic acid, and combinations thereof.

3. The article of claim 2 wherein said barrier layer consists essentially of aliphatic polyester.

4. The article of claim 2 wherein said barrier layer consists essentially of ethylene vinyl alcohol.

5. The article of claim 2 wherein said barrier layer consists essentially of polyurethane.

* * * * *